W. H. STAATS.
PNEUMATIC SPRING.
APPLICATION FILED APR. 22, 1910.

1,016,651.

Patented Feb. 6, 1912.
2 SHEETS—SHEET 1.

Witnesses
J. G. Stinkel
Cyril S. Brown

Inventor
W. H. Staats
by Foster Freeman Watson & Coit
Attorneys

W. H. STAATS.
PNEUMATIC SPRING.
APPLICATION FILED APR. 22, 1910.

1,016,651.

Patented Feb. 6, 1912.

2 SHEETS—SHEET 2.

Witnesses
Inventor
W. H. Staats
Attorneys

UNITED STATES PATENT OFFICE.

WILLIAM H. STAATS, OF COLONIE, NEW YORK.

PNEUMATIC SPRING.

1,016,651.   Specification of Letters Patent.   Patented Feb. 6, 1912.

Application filed April 22, 1910. Serial No. 557,049.

*To all whom it may concern:*

Be it known that I, WILLIAM H. STAATS, a citizen of the United States, and resident of Colonie, county of Albany, State of New York, have invented certain new and useful Improvements in Pneumatic Springs, of which the following is a specification.

The present invention relates to an improvement in means for supporting a vehicle body so as to prevent shocks and jolts experienced by the axles or running gear from being transmitted to the body.

In particular the invention relates to means for the purpose described which employ pneumatic cushions in addition to the springs commonly arranged between the body and axles of a vehicle.

Figure 1:
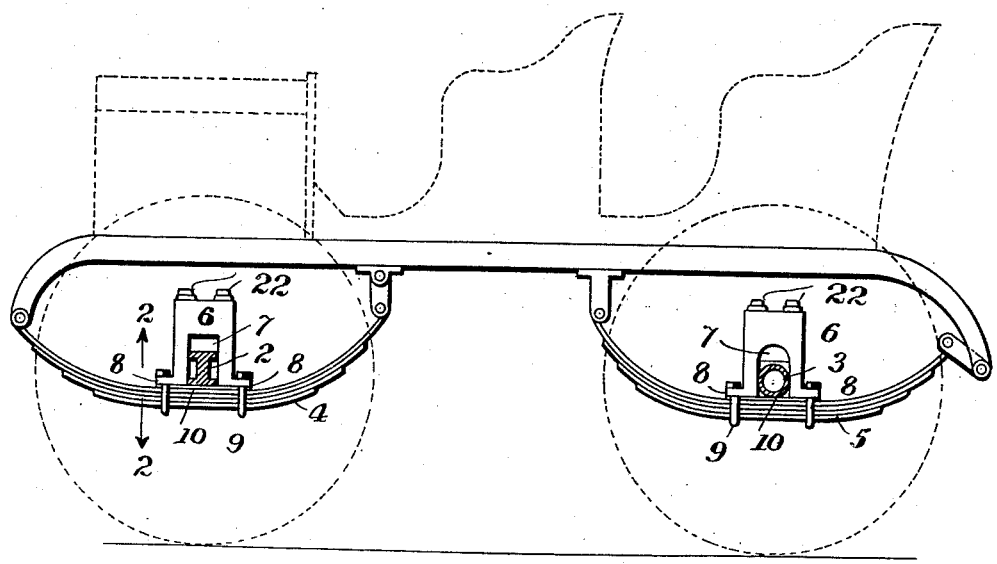
Figure 2:
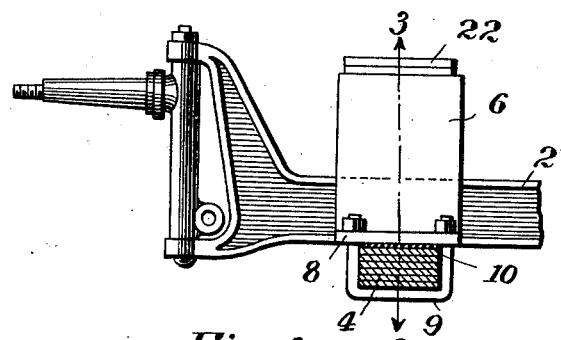
Figure 5:
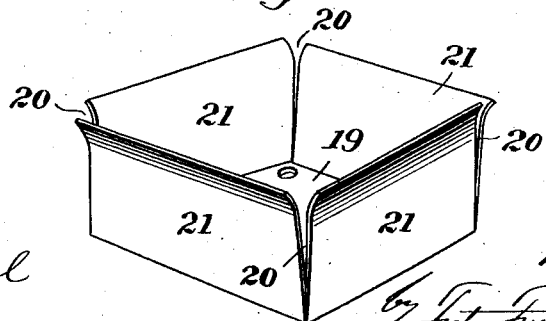
Figure 3:
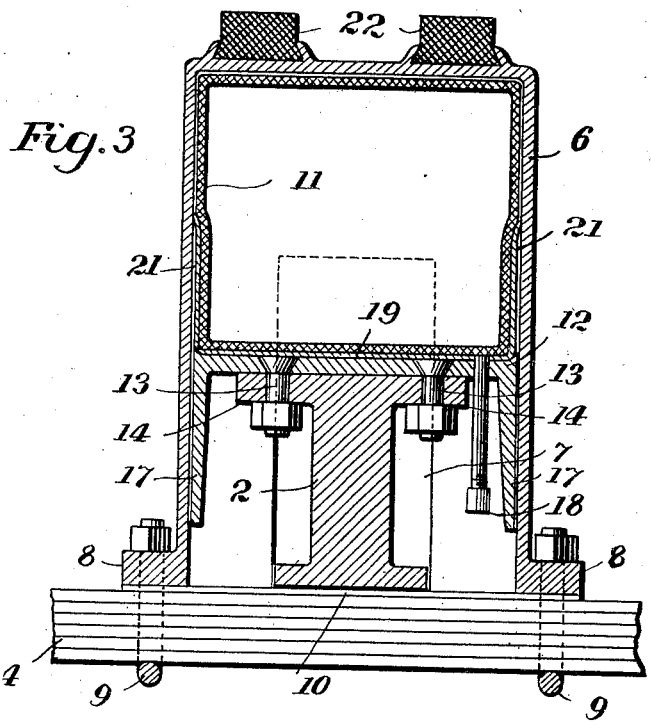
Figure 4:
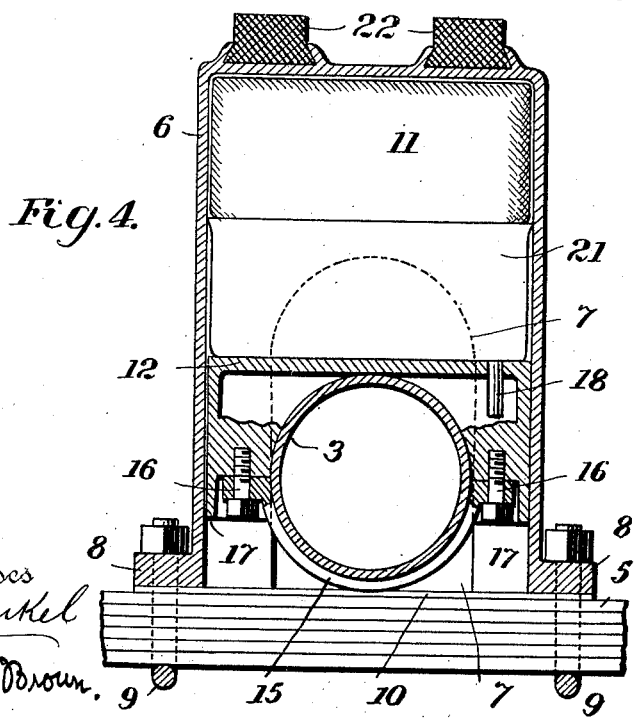

In the accompanying drawing, Figure 1 is a side elevation of a portion of a motor vehicle including an embodiment of the present invention; Fig. 2 is a sectional view, on a slightly enlarged scale, on the line 2—2 of Fig. 1; Fig. 3 is an enlarged sectional view on the line 3—3 of Fig. 2; Fig. 4 is a view, similar to Fig. 3, but showing the rear axle construction; Fig. 5 is a detail view.

Referring to the drawings 1 designates the frame on which the vehicle body is mounted and 2, 3, respectively the front and rear axles of the vehicle. These parts are illustrated more or less conventionally as their construction may be greatly varied without departing from the invention herein referred to.

Suitable leaf springs such as are commonly employed are represented at 4, 5, and between each of said springs and the adjacent axle is arranged a pneumatic shock absorber or cushioning mechanism that will now be particularly described. Such mechanism comprises a telescopic casing having its members attached respectively to the axle and spring and an intermediate inflatable cushion. The main casing member 6 is open at its lower end and is provided in opposite side walls with slots 7 through which the axle extends, such slots, as shown, preferably extending to the lower end of said member. At its lower end said casing is provided with laterally extending flanges 8 which are connected with the ends of suitable clips 9 that embrace the adjacent leaf springs and bind the same and said casing member 6 rigidly together. Preferably the upper surface of the spring is covered by a strip 10 of flexible material which extends beneath the flanges 8. The bottom of the chamber or cushion box, within which the inflatable cushion 11 is arranged, includes a plate 12 that extends across the upper surface of the axle and in the case of a solid axle, such as represented in Figs. 2 and 3, is securely bolted or riveted as at 13 to lateral lugs or ears 14 thereon. In case the axle is tubular, such as are commonly employed for the rear driving wheels of motor vehicles, and as illustrated in Fig. 4, the compression plate 12 is secured thereto by a clip 15 and bolts or screws 16. The compression plate is substantially the same size and shape as the cross sectional area of the casing member 6 and is provided at opposite sides with depending guides or flanges 17 which extend sufficiently close to the leaf spring as to have a considerable length of bearing against the adjacent walls of said casing member and thus act to hold the same against movement relative to the spring on which it is mounted.

From the foregoing description it will be seen that the members of the casing for the inflatable cushion are arranged above the spring 4, 5, and close about the axle, such spring being in fact supported practically directly from the axle by the cushioning device. This insures a very stable and strong construction and reduces to a minimum the strains exerted on the casing 6, such strains being practically limited to those operating in a vertical direction. The inflatable cushion 11 is arranged within the chamber formed by the top and sides of the member 6 and the compression plate 12 and a suitable inflating tube 18 preferably extends downwardly through said plate.

As shown the cushion is preferably made substantially rectangular in cross section. The lower end of this cushion is seated in a cup like receptacle formed by bending upwardly the edge of a relatively thin disk 19 and by means of vertical corner slits 20 forming such upturned portion into four resilient flanges 21. Said flanges are flared outwardly slightly at their upper edge so that they bear against the inner face of the casing member 6, as shown in Fig. 3. By this arrangement there is avoided any danger of the inflatable cushion being cut by being pinched against a sharp edge or wedged between oppositely moving parts as the plate 12 and casing 6 are relatively reciprocated. Referring to Fig. 3, it will be seen that the resilient flanges 21 extend upwardly sufficiently to close the portions of the slots 7 that extend above the axle. The top of the casing 6 may be provided with two transversely extending buffers 22 formed of rubber or similar yielding material to insure that no damage will be done to the casing top in case an unusually heavy jolt should bring the same against the frame 1.

Having described my invention what I claim as new and desire to secure by Letters-Patent, is, 1. The combination with a vehicle frame, an axle, and a leaf spring having its ends attached to the frame, of a casing, open at its lower end, mounted on the upper side of the spring and having in opposite side walls slots that extend to the lower edge of such walls and through which the axle passes, a compression plate mounted on the axle within said casing and having depending guides bearing against adjacent walls of the casing, and a pneumatic cushion arranged within the casing between the top thereof and said compression plate.

2. The combination with an axle and vehicle body spring, of a shock absorber or cushioning apparatus comprising a casing including two telescopic members connected respectively to the axle and spring, a pneumatic cushion arranged between said members and a disk, having upturned outwardly flaring flanges, arranged within the casing and receiving the lower portion of the cushion, the upper edges of said disk flanges bearing against the inner face of the casing, substantially as and for the purpose described.

3. The combination with a vehicle axle, a casing having its lower end open and provided in opposite side walls with slots through which the axle extends, a leaf spring extending beneath and securely attached to flanges at the lower end of said casing, a compression plate secured on the axle and inclosed by the side walls of the casing, a disk on said plate having its edges bent upwardly and yieldingly bearing against the inner faces of the walls of the casing, and a pneumatic cushion having its lower end seated within the resilient flanges on said disk and its upper end bearing against the top of the casing.

In testimony whereof I affix my signature in presence of two witnesses.

WILLIAM H. STAATS.

Witnesses:
HENRY A. STRONG,
GEO. W. ANDREW.

---

Copies of this patent may be obtained for five cents each, by addressing the "Commissioner of Patents, Washington, D. C."